United States Patent
Murphy

(10) Patent No.: US 11,724,765 B2
(45) Date of Patent: Aug. 15, 2023

(54) SYSTEMS AND METHODS FOR THROTTLING TO ACCELERATION TARGETS

(71) Applicant: Lyft, Inc., San Francisco, CA (US)

(72) Inventor: Conrad Xavier Murphy, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 787 days.

(21) Appl. No.: 16/547,363

(22) Filed: Aug. 21, 2019

(65) Prior Publication Data

US 2021/0053643 A1 Feb. 25, 2021

(51) Int. Cl.
| | |
|---|---|
| G06F 7/70 | (2006.01) |
| B62J 99/00 | (2020.01) |
| B62K 11/00 | (2006.01) |
| B62J 45/20 | (2020.01) |
| B62J 45/40 | (2020.01) |
| B62J 50/20 | (2020.01) |

(52) U.S. Cl.
CPC .............. *B62J 99/00* (2013.01); *B62J 45/20* (2020.02); *B62J 45/40* (2020.02); *B62J 50/20* (2020.02); *B62K 11/00* (2013.01)

(58) Field of Classification Search
CPC ... B62J 99/00; B62J 50/20; B62J 45/20; B62J 45/40; B62K 11/00
See application file for complete search history.

(56) References Cited

U.S. PATENT DOCUMENTS 10,832,593 B1 * 11/2020 Dahl ................ G09B 19/167

FOREIGN PATENT DOCUMENTS

CN 100421983 C * 10/2008 .......... B60W 30/188

\* cited by examiner

*Primary Examiner* — Adam M Alharbi
(74) *Attorney, Agent, or Firm* — Baker Botts L.L.P.

(57) ABSTRACT

The disclosed computer-implemented method may include detecting a throttle position of a micromobility vehicle (MV) and determining an acceleration of the MV based at least on the throttle position. The acceleration is associated with a torque magnitude of the MV. The method also includes comparing the acceleration with a target acceleration associated with the throttle position. The method further includes modifying the torque magnitude based at least on the comparison of the acceleration of the MV with the target acceleration associated with the throttle position. Various other methods, systems, and computer-readable media are also disclosed.

24 Claims, 10 Drawing Sheets

SYSTEMS AND METHODS FOR THROTTLING TO ACCELERATION TARGETS

BACKGROUND

Electronic control units (ECUs) of automotive vehicles typically use torque-based control in which a motor output is adjusted until it matches a torque demand (e.g., a torque commanded by a driver using vehicle controls). The ECU contains mathematical models and maps that calculate the torque output of the motor based on known input conditions. This torque-based control has made driving of vehicles smoother by predicting the amount of motor output torque needed to satisfy driver or cruise control demand and the precise combination of motor control input variables to obtain that result, without having to hunt for a solution by trial and error.

Recently, interest has risen in vehicles that are significantly smaller and lighter in weight, such as micromobility vehicles (MVs). For such vehicles, the weight of the driver and cargo is more significant in determining throttle response of the vehicle. As a result, modern day MVs, such as electric bikes and scooters, encounter various problems with the throttle being mapped to the torque output of the MV. A significant factor in the rise of this problem is that many MVs are designed with the assumption that the mass of the rider dominates the total mass of the whole system, typically comprising of the rider, cargo, and the MV. In cases where the mass of the rider does not necessarily dominate the total mass of the system, or if the mass of the rider is significantly above or below average, various problems and unintended consequences can result. For illustration, consider a female rider in a lower percentile of her weight class. She could experience twice the acceleration on a MV compared to that of a male rider in a higher percentile of his weight class.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
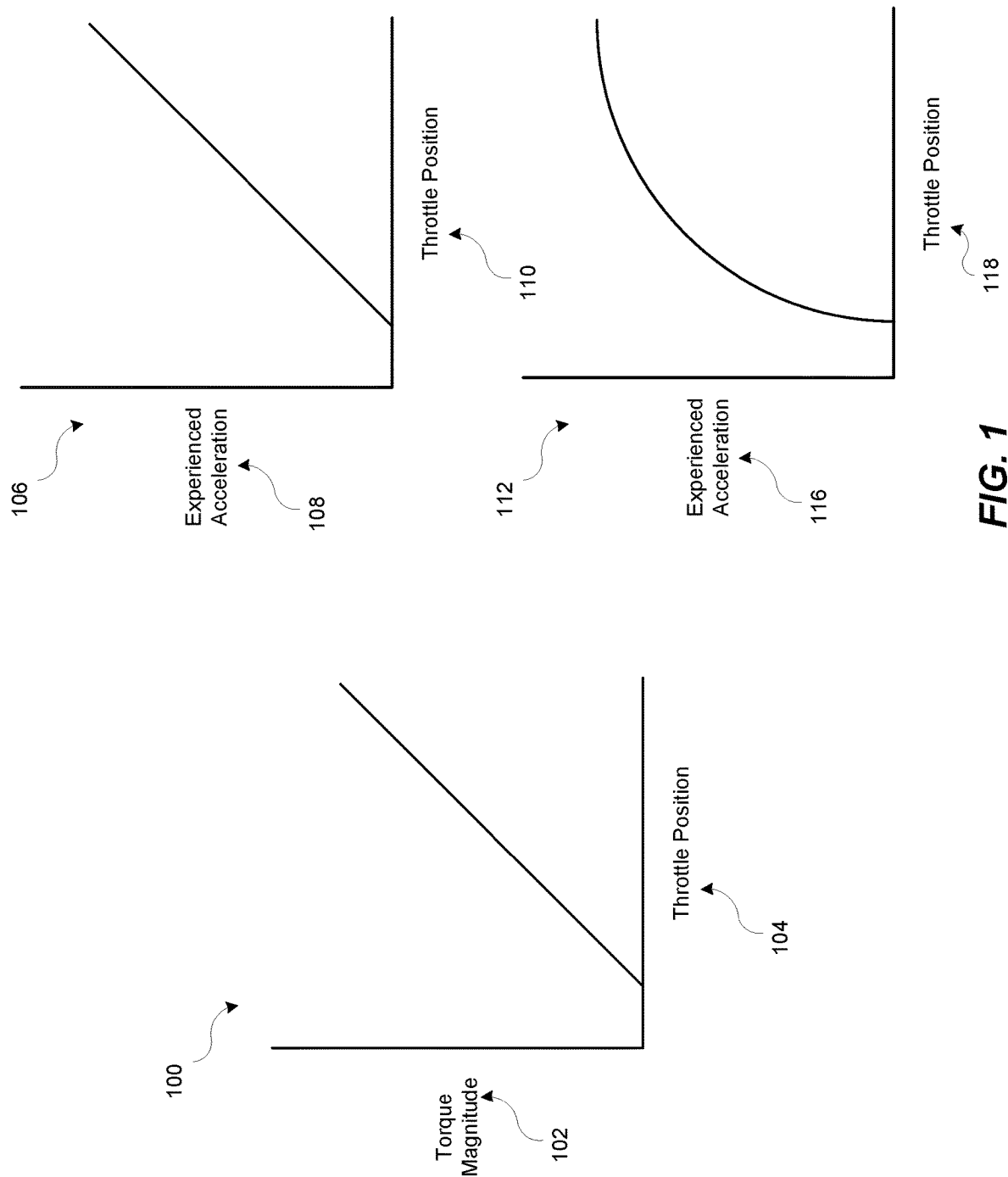
FIG. 1 is a graphical illustration of a torque profile and consequent micromobility vehicle accelerations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to implementation of a target acceleration profile that maps throttle position to a target acceleration. As will be explained in greater detail below, embodiments of the present disclosure may utilize the target acceleration profile to determine a torque magnitude, which can be adjusted based on measured vehicle acceleration to achieve the target acceleration.

The following will provide, with reference to FIGS. 1-10, detailed descriptions of systems and methods of operation for a micromobility vehicle (i.e., personal mobility vehicle). These systems and methods implement a target acceleration profile that maps throttle position to a target acceleration. The systems and methods utilize the target acceleration profile to determine a torque magnitude, which can be adjusted based on measured vehicle acceleration to achieve the target acceleration.

Referring to FIG. 1, a torque profile 100 is shown as a graph that illustrates torque magnitude 102 as a function of the throttle position 104 being a linear relationship for purposes of simplicity and explanation. This torque profile 100 may be used to generate a torque magnitude 102 as a function of throttle position 104, and the output of the motor may be driven to match the torque magnitude 102. Resulting vehicle accelerations 108 and 116 are shown in graphs 106 and 112 that illustrate experienced vehicle acceleration 108 and 116 as a function of throttle position 110 and 118. Vehicle acceleration 108 is experienced by the male rider in the higher 95th percentile of his weight class, whereas vehicle acceleration 116 is experienced by the female rider in the lower 5th percentile of her weight class. For the male rider, as the throttle position 110 increases, the vehicle acceleration 108 of the MV also increases in a steady, linear fashion as shown at 106. As such, the male rider enjoys a smooth ride as he actuates the throttle. For the female rider, however, as the throttle position 118 increases, the vehicle acceleration 116 of her MV increases much more quickly. As a result of a much faster increase in vehicle acceleration 116, the female rider is thrown from her MV. The present disclosure presents solutions to the problems arising for MVs when torque magnitude 102 is used a metric that is mapped directly to throttle position 104.

Figure 2:
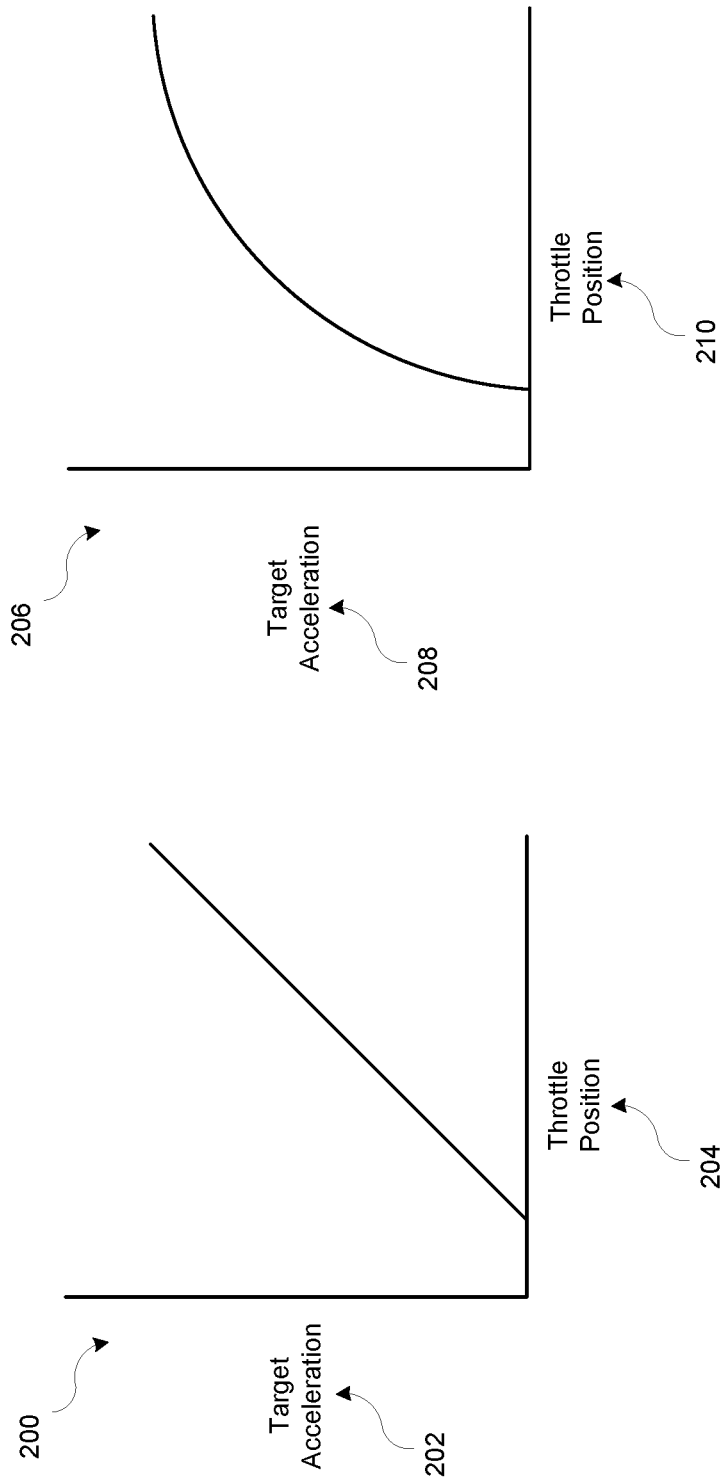
FIG. 2 is a graphical illustration of target acceleration profiles.

FIG. 2 is a graphical illustration of a linear target acceleration profile 200 and a more aggressive nonlinear target acceleration profile 206. With target acceleration profiles 200 and 206, a target acceleration 202 and 208 is associated with throttle position 204 and 210 (i.e., throttle deflection) in lieu of torque magnitude 102 (see FIG. 1) being associated with throttle position 104 (i.e., throttle deflection). One goal of utilizing a target acceleration profile 200 or 206 can be to provide a steady or predictable increase in the experienced acceleration of the MV, irrespective of differences in the rider's weight and/or cargo. Another goal of using a target acceleration profile 200 or 206 can be to provide a consistent experience regardless of how much weight, cargo, etc. the rider has so that anytime they use a micromobility vehicle implementing such a profile 200 or 206, they know how much response to expect from actuating the throttle to a certain throttle position 204 or 210. Another benefit can be a consistent acceleration experience on changing inclines, declines, etc. A further benefit of target acceleration profiles 200 or 206 is that different profiles 200 and 206 can be used for different riders based on rider skill levels and preferences.

In the example detailed above, both the male and female riders utilizing the same target acceleration profile would then be able to experience the same or a similar increase in the experienced acceleration as a result of actuating the throttle. However, as detailed below, different riders may have different preferences, skill levels, profiles, selections, riding behaviors, etc. that may determine the target acceleration profile 200 or 206 used by that rider. For example, an experience rider can have an aggressive acceleration profile 206 while a beginner can have a more moderate/dampened acceleration profile 200.

Various solutions disclosed herein employ various hardware and techniques (GPS, accelerometer, speed sensor, acceleration sensor, wireless positioning, etc.) for measuring vehicle acceleration. An example technique for achieving the above results involves an ability to measure and control the wheel speed of the MV in real-time. In one example, the rate of change of the wheel speed can be measured as the acceleration. This capability makes it possible to interpret a throttle position 204 or 210 as a given amount of target acceleration 202 and 208, as opposed to a given amount of torque magnitude. This interpretation may be implemented to provide consistency in the experienced acceleration of the MVs amongst riders of varying weight classes and even widely varying weight classes. In addition, this consistency can be experienced irrespective of a rider taking on cargo (e.g., a heavy backpack or when the user loads the vehicle's cargo hold with heavy items) during the middle of a ride and/or when one or more other passengers decide to jump on the MV to ride along. In addition, this consistency can be experienced for inclines, declines, and other terrains with varying vertical and/or horizontal dimensions of ground surfaces.

In FIG. 2, the target acceleration profile 200 illustrates a solution with target acceleration 202 as a function of throttle position 204, showing a linear curve for ease of illustration. A torque magnitude is computed, based on the target acceleration 202, as an input to a torque drive system which is configured to achieve a matching output motor torque. The torque magnitude (i.e., torque demand) that is input to the torque drive system may be modified dynamically and/or semi-statically based on measured acceleration to achieve the target acceleration 202. This measured acceleration may be associated with a torque magnitude in that the measured acceleration resulted from a previous or ongoing attempt to drive the output torque of the motor to match the target acceleration 202. Thus, the torque magnitude with which the measured acceleration is associated may be a torque magnitude that was previously determined using the target acceleration 202, or a torque magnitude that resulted from a previous modification of such a previously determined torque magnitude. This relationship is explained in greater detail below with reference to FIGS. 7 and 8.

Continuing with reference to FIG. 2, torque (T) equals the moment of inertia (I) as a product of the angular acceleration (α) in rotational motion (the moment of inertia being the value that describes the distribution of mass). Thus, by measuring or monitoring the angular acceleration of the wheel in real-time, the torque magnitude can be adjusted accordingly such that the MV can meet the target acceleration 202 shown in the profile 200. For example, torque magnitude (e.g., torque T) may be calculated as follows:

$$T=I\alpha,$$

where T=torque around a defined axis (N·m), I=moment of inertia (kg·m2), and α=angular acceleration (radians/s$^2$). For example, consider that the throttle is actuated to a degree preconfigured to meet target angular acceleration (Target α), which can be configured as target acceleration 202 in the profile 200. However, the angular acceleration measured in real-time (Measured α) is below the Target α. In this scenario, the motor increases the torque magnitude (e.g., torque T) until a delta Δ between the Target α and the Measured α (e.g., difference between, ratio of, etc. the Measured α and the Target α) becomes zero or falls below a threshold. Similarly, for profile 206, a throttle position 210 determines a target acceleration 208 that can be used to determine a torque magnitude in the manner detailed above. In this example, an angular acceleration is described for use with a wheel speed sensor, but it should be understood that the target acceleration may be implemented in various ways. For example, a linear target acceleration may be implemented for use with a vehicle linear speed determination component (e.g., GPS, accelerometer, and/or wireless positioning capability, etc.) as described in greater detail below with reference to FIG. 5.

It should be noted that the problem described above may not arise in larger vehicle scenarios (e.g., cars) because the mass of the driver may typically represent only a small fraction of the whole system due to the larger vehicle being much heavier. Additionally, such larger vehicles generally do not try to limit performance (e.g., torque).

Figure 3:
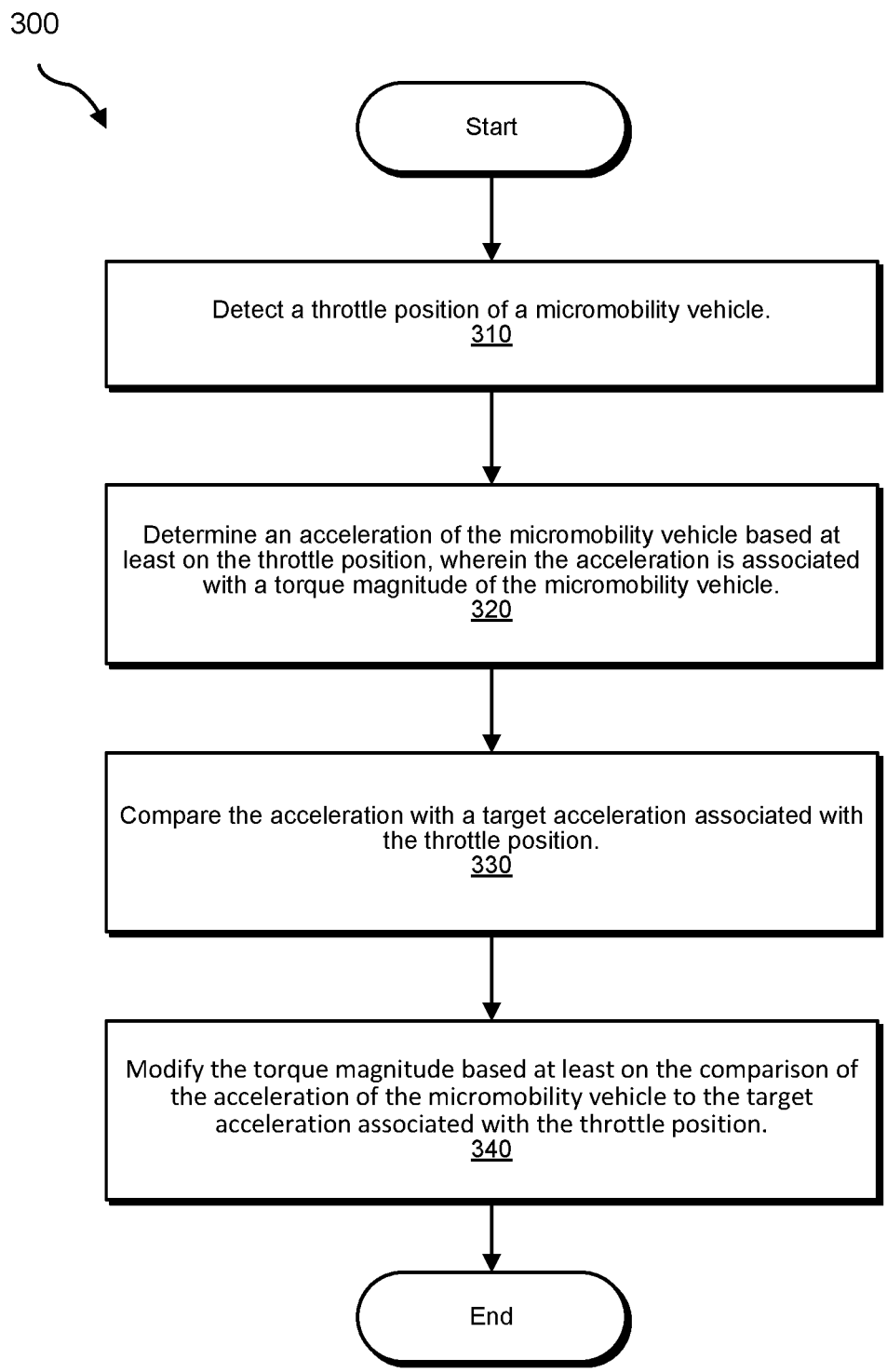
FIG. 3 is a flow diagram of an exemplary method of operation for a micromobility vehicle.

FIG. 3 is a flow diagram of an exemplary computer-implemented method 300 of operation for a micromobility vehicle. The steps shown in FIG. 3 may be performed by any suitable computer-executable code and/or computing system, including the system(s) illustrated in FIGS. 4-10. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may detect a throttle position of a micromobility vehicle. For example, an electronic control unit (ECU) of the micromobility vehicle may receive a signal indicative of a throttle position (i.e., amount of deflection from a designated zero point). The term "signal" may refer to an analog signal (e.g., voltage) and/or a digital data signal. Information indicative of the throttle position may be stored in a computer memory of the ECU. Processing may proceed from step 310 to step 320.

At step 320, the method includes determining an acceleration of the micromobility vehicle based at least on the throttle position, wherein the acceleration is associated with a torque magnitude of the micromobility vehicle. For example, the micromobility vehicle may measure the acceleration based on a wheel speed or angular acceleration from a sensor disposed at a wheel or axle of the MV. Alternatively or additionally, the micromobility vehicle may be equipped with GPS, an accelerometer, and/or wireless positioning capability that allows the MV to determine the acceleration. The micromobility vehicle may receive a signal and/or determine an acceleration and store information regarding the measured acceleration in a computer memory of the ECU. Processing may proceed from step 320 to step 330.

At step 330, the method includes comparing the acceleration with a target acceleration associated with the throttle position. For example, the ECU may determine a target acceleration based on a target acceleration profile and the throttle position and compare it to the measured acceleration. A resulting acceleration delta may be stored as information in a computer memory of the ECU. Accordingly, the throttle position may be associated with a throttle deflection of the micromobility vehicle, and the target acceleration may be associated with the throttle deflection in lieu of the torque magnitude being associated with the throttle deflection. Processing may proceed from step 330 to step 340.

At step 340, the method includes modifying the torque magnitude based at least on the comparison of the acceleration of the micromobility vehicle with the target acceleration associated with the throttle position. For example, the ECU may calculate a torque based on the target acceleration, calculate another torque based on the acceleration delta, and add the two torques to arrive at a torque magnitude that will achieve the target acceleration. This torque magnitude may be used as an input to a torque drive system of the ECU, and thus control operation of the MV in such a way that the output torque of the MV motor is caused to match the input torque magnitude (i.e., torque demand). Accordingly, based at least on the comparison of the acceleration with the target acceleration, the method may include determining a delta between the acceleration and the target acceleration, and determining a rate for modifying the torque magnitude based at least on the delta, wherein the torque magnitude is modified based on the determined rate. After step 340, processing may end. Alternatively, processing may return to a previous step in the process, such as step 310.

Various implementations of method 300 are contemplated. For example, iterative performance of steps 310-340 may be carried out in such a way that the method includes determining, at step 320, a change in the acceleration of the micromobility vehicle based at least on cargo added to the micromobility vehicle. This changed acceleration may be compared with the target acceleration at step 330, and the torque magnitude may be modified, at step 340, based further on the comparison of the changed acceleration with the target acceleration. Also, the acceleration determined at step 320 may be an angular acceleration of a wheel of the micromobility vehicle measured in real-time, and the target acceleration determined at step 340 may be a target angular acceleration of the wheel. In this case, the torque magnitude is modified, at step 340, based further on the comparison of the angular acceleration with the target angular acceleration. Further, in some implementations, the target acceleration associated with the throttle position may be determined, at step 340, for a rider profile. In this example, the torque magnitude is modified based on the target acceleration determined for the rider profile. Finally, step 340 may include determining a rate for modifying the torque magnitude based on a rider profile, and the torque magnitude may be modified based on the rate determined for the rider profile.

Figure 4:
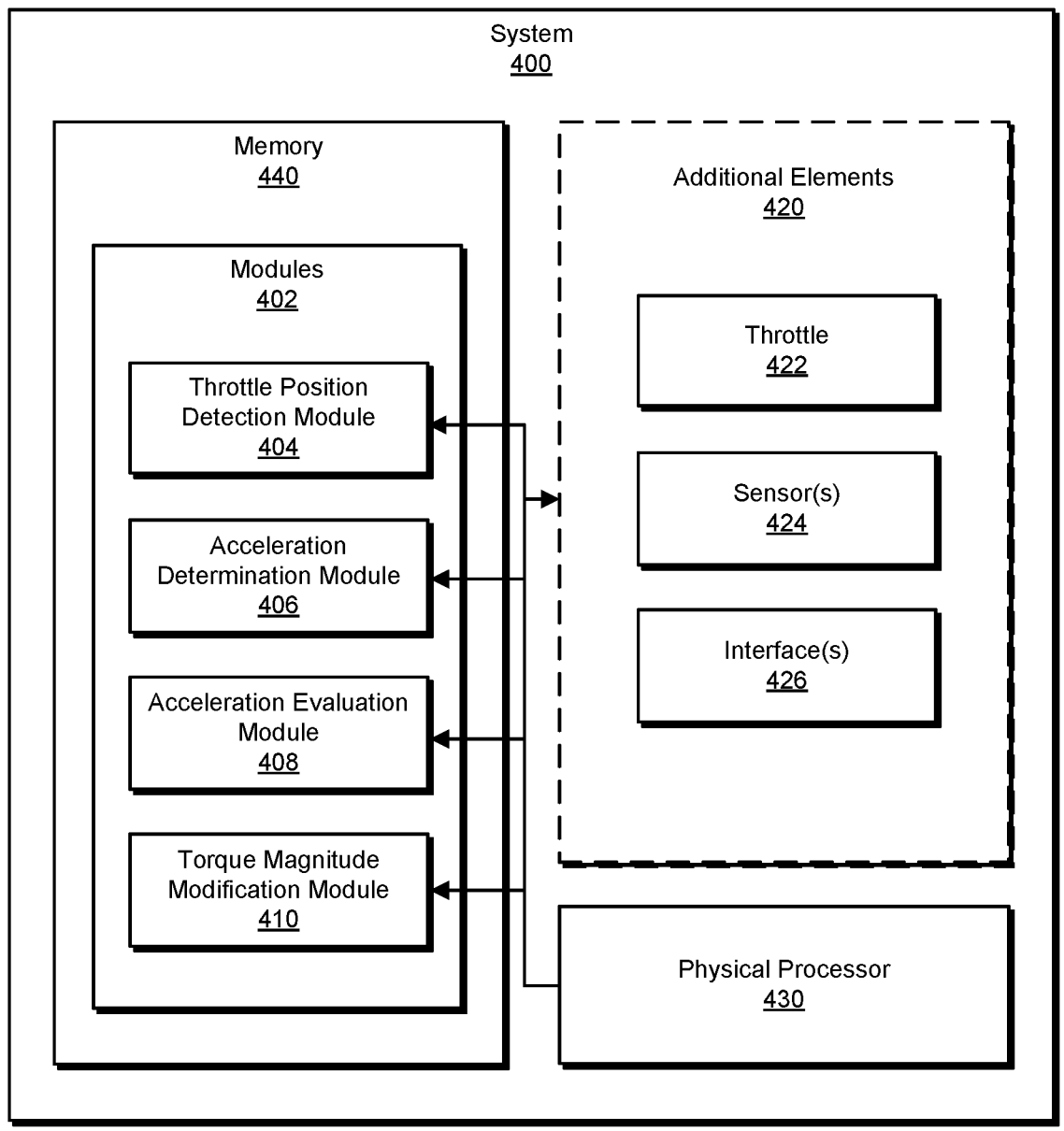
FIG. 4 is a block diagram illustrating a system for operating a micromobility vehicle.

FIG. 4 is a block diagram illustrating a system 400 for operating a micromobility vehicle. System 400 includes a physical processor 430 in communication with a memory 440 and additional elements 420. The memory 440 stores various modules 402 that include instructions for causing the processor 430 to carry out the operations of method 300 (see FIG. 3). For example, throttle position detection module 404 has instructions that cause the processor 430 to carry out operations detailed above with respect to step 310 (see FIG. 3). In operation, module 404 causes processor 430 to receive a signal from throttle 422. In this regard, interfaces 426 may include a component that allows processor 430 to interface with throttle 422. An example interface 426 may be an analog to digital converter (ADAC) that converts an analog signal from throttle 422 into a digital signal for processor 430.

Additionally, acceleration determination module 406 has instructions that cause the processor 430 to carry out operations detailed above with respect to step 320 (see FIG. 3). In operation, module 406 may cause processor 430 to receive a signal from a sensor 424, such as a wheel sensor, GPS, accelerometer, weight sensor etc. Alternatively or additionally, module 406 may cause processor 430 to operate wireless antennas of interfaces 426 to carry out wireless position determination operations (e.g., received signal strength indication (RSSI), fingerprinting, angle of arrival, time of flight, etc.). Module 406 may cause processor 430 to carry out positioning measurements (e.g., GPS or wireless) and determine vehicle acceleration from such measurements over time.

Also, acceleration evaluation module 408 has instructions that cause the processor 430 to carry out operations detailed above with respect to step 330 (see FIG. 3). In operation, module 408 may cause processor 430 to compare a target acceleration, determined from the throttle position acquired by module 404, with the acceleration measured by module 406, and thus determine an acceleration delta.

Further, torque magnitude modification module 410 has instructions that cause the processor 430 to carry out operations detailed above with respect to step 340 (see FIG. 3). In operation, module 410 may cause processor 430 to calculate a torque based on the target acceleration, calculate another torque based on the acceleration delta, and determine a torque magnitude as a sum of these two torques. The torque magnitude modification module 410 may serve as an input to a torque drive system of the MV.

Figure 5:
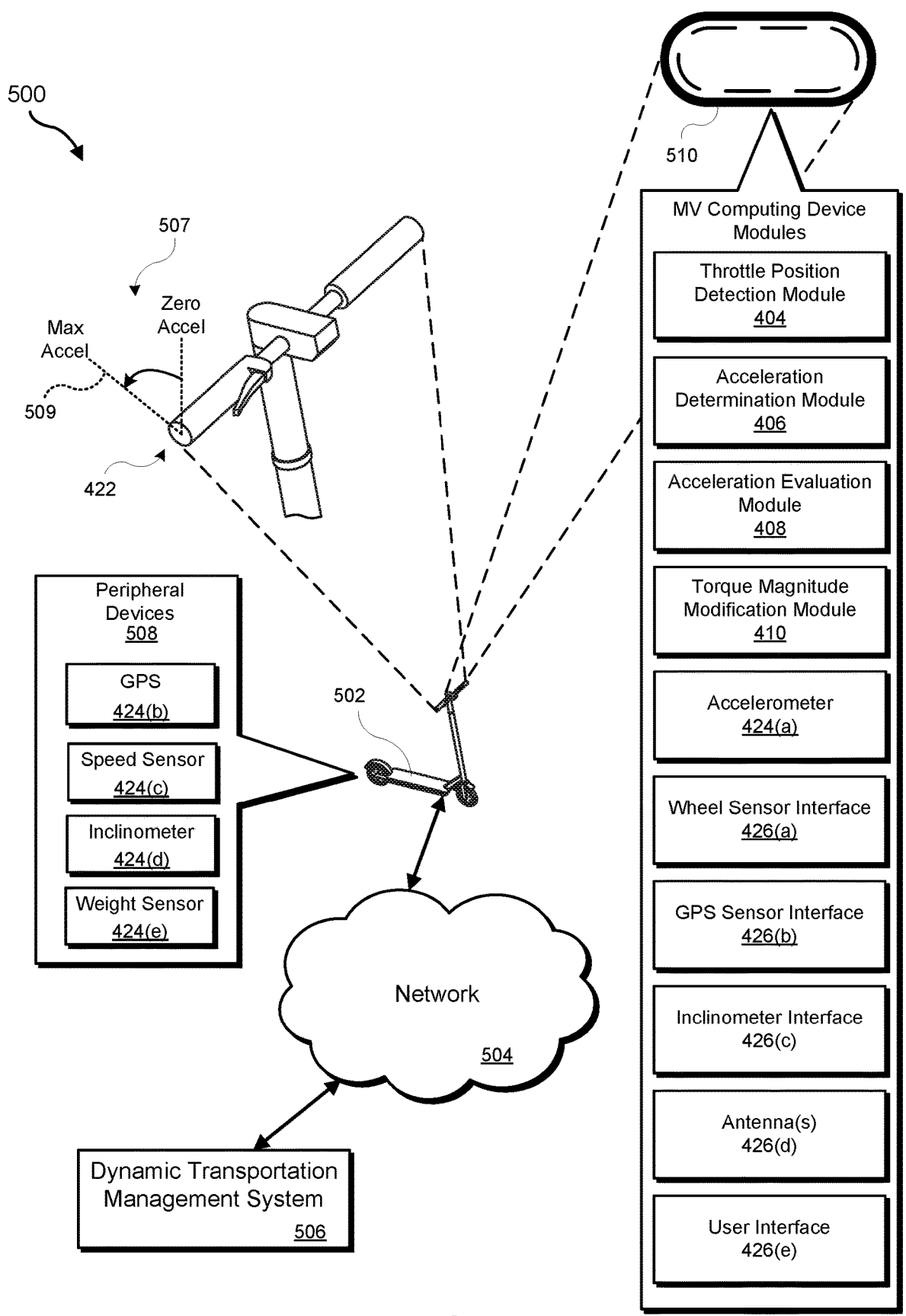
FIG. 5 is a block diagram illustrating an example system for operating a micromobility vehicle having mounted computing devices that include one or more antennas.

FIG. 5 is a block diagram illustrating an example system 500 for operating a micromobility vehicle 502 having mounted computing devices 510 that include one or more antennas 426(*d*). The MV 502 may use the antennas 426(*d*) to communicate with a dynamic transportation management system 506 over a wireless network 504, such as a cellular network or the Internet. MV 502 mounted computing devices 510 may also have a user interface 426(*e*), such as touchscreen or docking station for a rider's computing device (e.g., smartphone), and/or may use antennas 426(*d*) to interface with a rider's computing device. Accordingly, a rider may create, access, and/or update a rider profile stored as user data at dynamic transportation management system 506, which is described in detail below with reference to FIGS. 9 and 10.

Continuing with reference to FIG. 5, the user interface 426(*e*) may have an active display configured to graphically or textually indicate an amount of a target acceleration corresponding to a current throttle position 507. For example, a bar graph, dial, or textual readout may dynamically change to display a current target acceleration and/or measured acceleration. In some implementations, the display may take the form of a graph (see FIG. 2) that depicts a current target acceleration profile, and the display may illuminate or otherwise indicate an area under the profile line or curve based on current throttle position to indicate the corresponding target acceleration. In this way, a rider can readily appreciate what kind of acceleration profile is being used, immediately recognize when the acceleration profile changes, and quickly identify the amount of acceleration that will be targeted by holding the throttle in the current throttle position.

The mounted computing devices 510 may also include modules 404-410, as previously described, and throttle position detection module 404 may detect a throttle position 507 which is associated with an amount of deflection 509 of throttle 422 from a zero acceleration set point or end point of throttle 422 travel. The throttle 422 may be labeled to indicate one or more amounts of acceleration based on throttle position 507, such as zero acceleration and maximum acceleration setpoints, one or more of which may correspond to a throttle travel endpoint. The mounted computing devices 510 may further include accelerometer 424(a), and various interfaces 426(a)-426(c) for communicating with peripheral devices 508 (e.g., GPS 424(b), speed sensor 424(c), inclinometer 424(d), and weight sensor 424(e)). The inclinometer 424(d) may provide input that can be used to determine when the MV 502 is operating on a level surface, which may aid the MV in determining when an acceleration delta represents MV load (e.g., rider weight plus cargo) and not inclination. Accordingly, the MV 502 may use the acceleration delta and inclinometer to compute or update rider weight, detect addition of cargo, etc. Alternatively or additionally, weight sensor 424(e) may be used to detect weight of riders and/or cargo, and thus a change in measured weight may be used to detect addition of cargo or additional riders.

Figure 6:
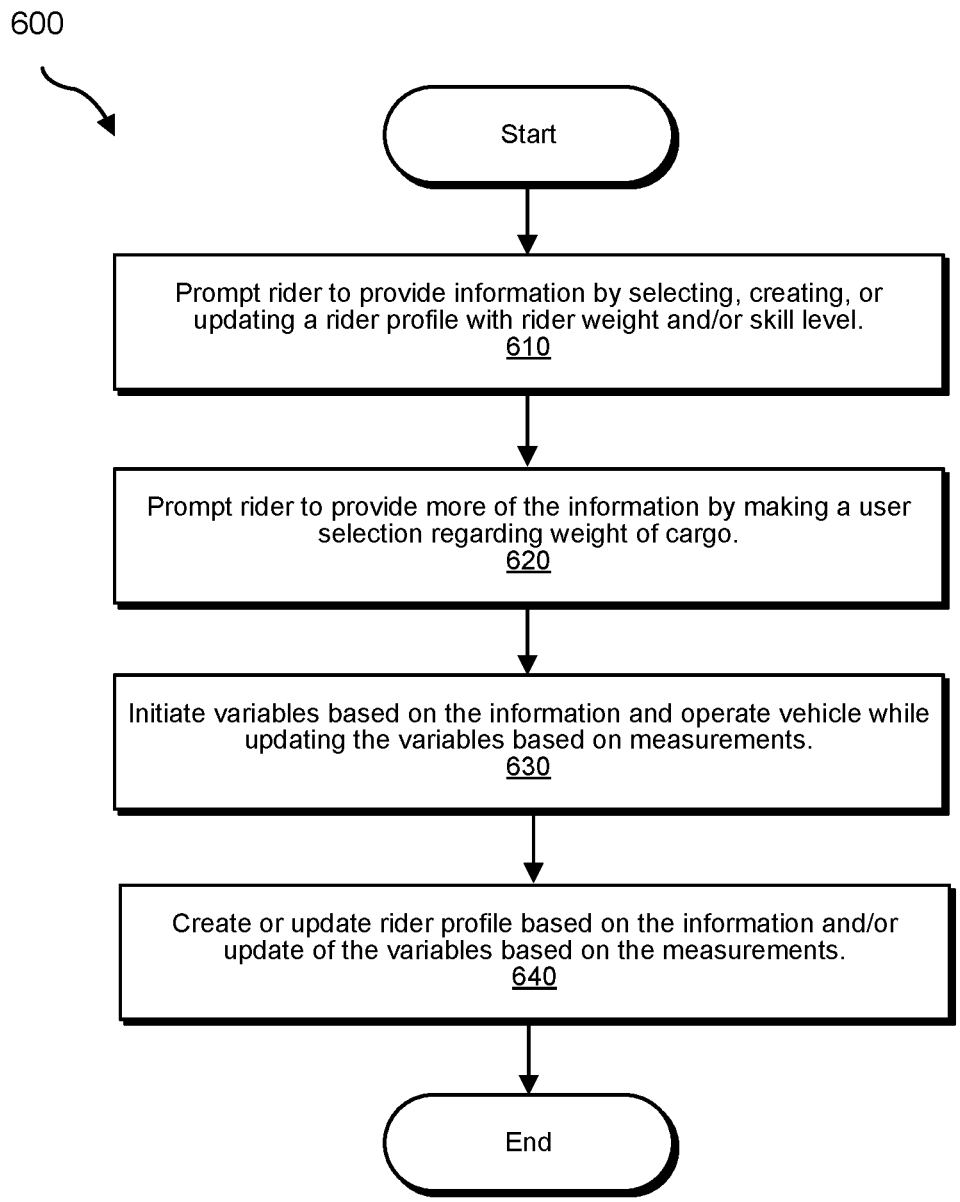
FIG. 6 is a flow diagram of an exemplary method of implementing a rider profile.

FIG. 6 is a flow diagram of an exemplary method 600 of implementing a rider profile. At step 610, the method 600 includes prompting a rider to provide information by selecting, creating, or updating a rider profile with rider weight and/or skill level. An existing rider profile selected by the rider may be obtained from user data stored on a dynamic transportation management system 506 (see FIG. 5) as described below with reference to FIGS. 9 and 10. Alternatively or additionally, a rider and/or cargo weight can be determined using sensors of the MV and/or in an staging area from which such MVs are deployed (e.g., weight sensors of the MV, weight sensors in the cargo are of the MV, a scale in a staging area of the MV, pressure sensors under a road surface in the staging are of the MV, etc.). The MV and/or dynamic transportation management system 506 (see FIG. 5) can determine an initial rider and/or cargo weight for formulation or refinement of the rider profile. For example, cargo weight and gross vehicle weight can be measured using sensors, and the rider weight may be determined as a difference between the gross vehicle weight and a total of the cargo weight and a known MV weight. These weights or weight classes, whether obtained from a stored profile, provided by the rider, or determined using sensors, can iteratively refined during vehicle operation as further detailed below. Alternatively, the information from the sensors (e.g., weight, acceleration, and/or incline) and/or initial information (e.g., rider weight, cargo weight, and/or skill level) may be employed during operation of the MV without using iterative refinement of the initial information. The rider profile information may be stored in memory of the MV ECU during a ride. Processing may proceed from step 610 to step 620.

At step 620, the method 600 includes prompting a rider to provide more of the information by making a user selection regarding weight of cargo. For example, the rider may be prompted to indicate whether the rider is carrying any cargo. If the rider response indicates that cargo is being carried, then an additional prompt may ask the rider to select a weight range for the cargo (e.g., less than 25 pounds, 25 pounds to 50 pounds, etc.). The rider's responses can be stored in memory of the MV ECU. Alternatively or additionally, sensors can be used to determine cargo weight as described above. Processing may proceed from step 620 to step 630.

At step 630, the method 600 includes initiating variables based on the information and operating the MV while updating the variables based on measurements. For example, the rider skill level may be used to select a target acceleration profile, with more skilled riders being provided with a more aggressive acceleration profile. Additionally, a rider weight and cargo weight may be added and used to select, via a lookup table or other data structure, a semi-static acceleration delta that represents an initial estimate of vehicle load. If this information is not available, a less aggressive acceleration profile and a default semi-static acceleration delta may be used initially to ensure safe operation even for an unskilled rider of exceptionally low weight. Other variables may be initially set to a value, such as zero, that is suitable for initial operation of the MV. The vehicle may then be operated initially in a safety mode on level ground so that vehicle load can be accurately assessed, and the semi-static acceleration delta can be updated accordingly. Once this assessment has occurred, then if the rider frequently maximizes the throttle position, a higher skill level may be assigned and a more aggressive acceleration profile utilized. Addition of cargo during the ride may be detected and the semi-static acceleration delta updated accordingly. Processing may proceed from step 630 to step 640.

At step 640, the method 600 includes creating or updating rider profile based on the information and/or update of the variables based on the measurements. For example, if the rider chose to create a rider profile and provide a rider weight at step 610, if the rider indicated no cargo, and if no addition of cargo was detected during the ride, then the semi-static acceleration delta that resulted from measurements during the ride, or a corresponding weight, may be stored in a rider profile as rider weight. Otherwise, if the rider chose to create a rider profile and provide a rider weight, but the rider indicated presence of cargo, or if addition of cargo was detected during the ride, then the rider weight provided by the rider may be stored in a rider profile as rider weight. If the rider did not create or select a profile, and if no addition of cargo was detected during the ride, then the semi-static acceleration delta that resulted from measurements during the ride, or a corresponding weight, may be stored in a rider profile as rider weight. Storing this information as rider weight may be conditioned on prompting the rider to confirm that there was little or no cargo, and if the rider indicates that there was cargo, then the rider may be offered another opportunity to create a rider profile. A same or similar procedure may be used for riders who select a rider profile at step 610 and indicate no cargo at step 620, but for whom a semi-static acceleration delta determined at step 630 is significantly different than expected based on the rider weight of the profile. If lighter than expected, the rider weight of the profile may be reduced. If heavier than expected, the rider may be prompted to confirm that no cargo was carried or added before increasing the rider weight of the profile. A selected or detected rider skill level may also be saved in the rider profile. The created or updated rider profile may be stored as part of user data stored on a dynamic transportation management system 506 (see FIG. 5) as described below with reference to FIGS. 9 and 10.

Figure 7:
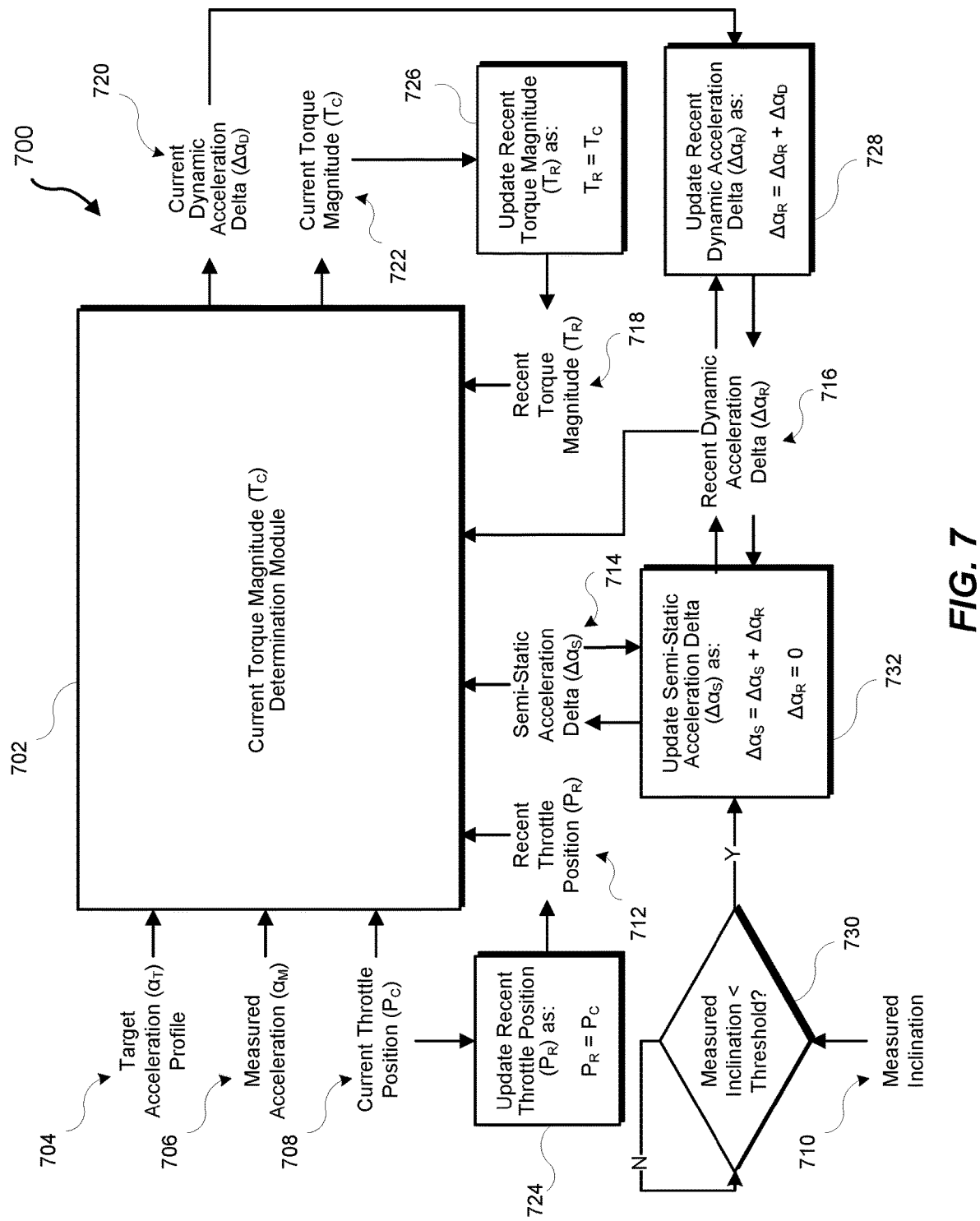
FIG. 7 is a block diagram illustrating a torque magnitude modification system implementing iterative use of information input to and output from an example of a current torque magnitude determination module.

FIG. 7 is a block diagram illustrating a torque magnitude modification system 700 implementing iterative use of information input to and output from an example of a current torque magnitude ($T_C$) determination module 702. This module may be implemented as an interface that provides a current torque magnitude ($T_C$) as an input to a torque drive system or it can be integrated into a torque drive system. Example inputs to current torque magnitude ($T_C$) determination module 702 include a target acceleration ($\alpha_T$) profile 704, a measured acceleration ($\alpha_M$) 706, a current throttle position ($P_C$) 708, and a measured inclination 710. These inputs to module 702 may be sensed or determined in any manner previously described. Example variables serving as inputs to module 702 include a recent throttle position ($P_R$) 712, a semi-static acceleration delta ($\Delta\alpha_S$) 714, a recent dynamic acceleration delta ($\Delta\alpha_R$) 716, and a recent torque magnitude ($T_R$) 718. These variables may be initialized in any manner previously described. Additionally, a $1^{st}$ Iteration flag ($1^{st}\_It$) may be initialized as equal to "true."

Example outputs of module 702 include a current dynamic acceleration delta ($\Delta\alpha_D$) 720 and a current torque magnitude ($T_C$) 722. The current torque magnitude ($T_C$) 722 is the output of the system that is provided as an input to the torque drive system, and is also used, at update block 726, to update the recent torque magnitude ($T_R$) 718 for a next iteration as:

$$T_R = T_C.$$

In some implementations, the current dynamic acceleration delta ($\Delta\alpha_D$) 720 may also be provided as an input to the torque drive system, which may determine a rate at which to drive the output torque of the motor to match the current torque magnitude ($T_C$) 722 based on the current dynamic acceleration delta ($\Delta\alpha_D$) 720. For example, if the delta is larger, a higher rate (e.g., change in torque/second) may be used for modifying the torque. Alternatively or additionally, the current dynamic acceleration delta ($\Delta\alpha_D$) 720 is used, at update block 728, to update the recent dynamic acceleration delta ($\Delta\alpha_R$) for a next iteration as:

$$\Delta\alpha_R = \Delta\alpha_R + \Delta\alpha_D.$$

Similarly, current throttle position ($P_C$) 708 is used, at update block 726, to update recent throttle position ($P_R$) 712 as:

$$P_R = P_C.$$

Meanwhile, the inclination 710 is evaluated at block 730 to determine if it is less than a threshold. If so, then the MV is sufficiently level for the value of the recent dynamic acceleration delta ($\Delta\alpha_R$) to accurately reflect a component of vehicle load that is not yet captured by the semi-static acceleration delta ($\Delta\alpha_S$S) 714, and update block 732 is triggered to update semi-static acceleration delta ($\Delta\alpha_S$) 714 and the recent dynamic acceleration delta ($\Delta\alpha_R$) as follows:

$$\Delta\alpha_S = \Delta\alpha_S + \Delta\alpha_R,$$

$$\Delta\alpha_R = 0.$$

This procedure allows the semi-static acceleration delta ($\Delta\alpha_S$) 714 to capture an amount of modification needed to account for vehicle load, and for the recent dynamic acceleration delta ($\Delta\alpha_R$) and current dynamic acceleration delta ($\Delta\alpha_C$) of subsequent iterations to reflect an amount of modification needed to account for inclination. Thus, when the semi-static acceleration delta ($\Delta\alpha_S$) 714 initially adjusts after the start of the ride, the adjusted value can indicate the rider weight plus any cargo at the start of the ride, and a subsequent adjustment above a threshold constitutes detection of additional cargo added during the ride. A lowest weight among these adjusted semi-static acceleration deltas ($\Delta\alpha_S$) 714 may be taken as the rider weight absent disambiguation by rider selections to provide information about rider weight and/or cargo.

Figure 8:
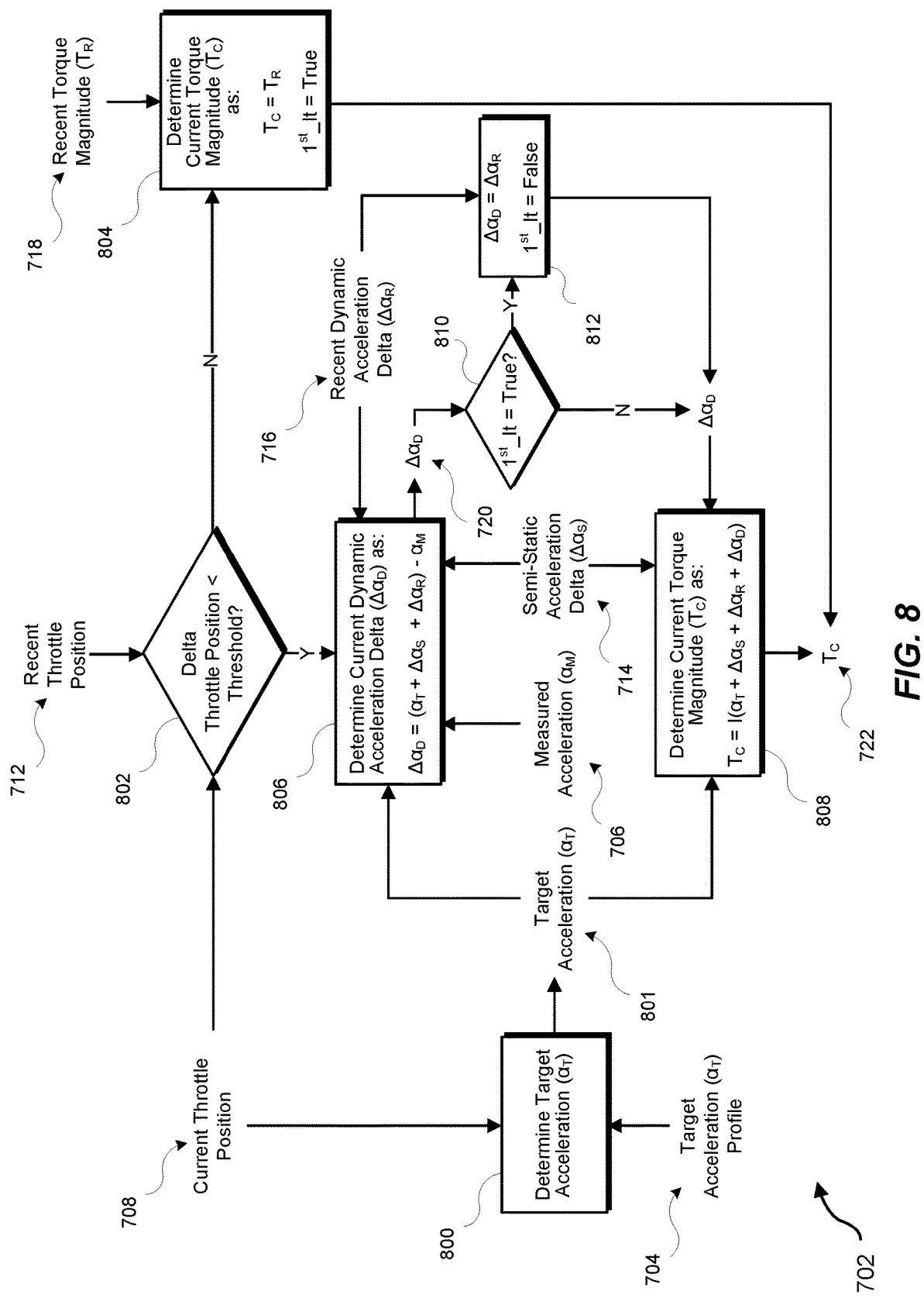
FIG. 8 is a block diagram illustrating example operations carried out by an example current torque magnitude determination module.

FIG. 8 is a block diagram illustrating example operations carried out by an example current torque magnitude determination module 702. Determination block 800 determines a target acceleration ($\alpha_T$) 801 based on the target acceleration ($\alpha_T$) profile 704 and the current throttle position ($P_C$) 708. However, debouncing decision block 802 checks to see if a difference between the current throttle position ($P_C$) 708 and the recent throttle position ($P_R$) 712 is below a threshold. If so, then the measured acceleration ($\alpha_M$) 706 will tend to reflect the result of using the current throttle position to generate the input to the torque drive system. Otherwise since throttle position is rapidly changing, block 804 determines the current torque magnitude ($T_C$) 722 based on the recent torque magnitude ($T_R$) 718 as:

$$T_C = T_R.$$

Block 804 also sets a $1^{st}$ Iteration flag ($1^{st}\_It$) equal to "true." However, if the throttle is being held in a substantially constant position, then block 806 uses the target acceleration ($\alpha_T$) 801, the measured acceleration ($\alpha_M$) 706, the semi-static acceleration delta ($\Delta\alpha_S$) 714, and the recent dynamic acceleration delta ($\Delta\alpha_R$) 716 to determine the current dynamic acceleration delta ($\Delta\alpha_D$) 720 as:

$$\Delta\alpha_D = (\alpha_T + \Delta\alpha_S + \Delta\alpha_R) - \alpha_M.$$

As set forth above, where the semi-static acceleration delta ($\Delta\alpha_S$) and the recent dynamic acceleration delta ($\Delta\alpha_R$) are zero, block 806 performs the operation of comparing the measured acceleration ($\alpha_M$) with the target acceleration ($\alpha_T$) associated with the current throttle position ($P_C$) 708, and it does so directly. Similarly, where the semi-static acceleration delta ($\Delta\alpha_S$) and/or the recent dynamic acceleration delta ($\Delta\alpha_R$) are not zero, then block 806 also performs the operation of comparing the measured acceleration ($\alpha_M$) with the target acceleration ($\alpha_T$) associated with the throttle position 708, but with the target acceleration ($\alpha_T$) being previously modified based on correction factors that correspond to the semi-static acceleration delta ($\Delta\alpha_S$) and/or the recent dynamic acceleration delta ($\Delta\alpha_R$). With these correction factors being iteratively updated at blocks 728 and 732 (see FIG. 7), the current dynamic acceleration delta ($\Delta\alpha_D$) is effectively driven to zero over time (e.g., in a single iteration or after expiration of a counter as described herein). Also, when the measured acceleration ($\alpha_M$) changes due to addition of cargo, the operation at block 806 compares this changed acceleration ($\alpha_M$) with the target acceleration ($\alpha_T$), and the torque magnitude is modified, at block 808, based on this comparison of the changed acceleration ($\alpha_M$) with the target acceleration ($\alpha_T$).

Continuing with reference to FIG. 8, if the a $1^{st}$ Iteration flag ($1^{st}\_It$) is determined, at block 810, to be equal to "true," then the current dynamic acceleration delta ($\Delta\alpha_D$) 720 may be reset, at block 812, to a value equal to the recent dynamic acceleration delta ($\Delta\alpha_R$) 716, and the a $1^{st}$ Iteration flag ($1^{st}\_It$) may be set equal to "false." This reset may occur, for example, for a first iteration following movement of the throttle to a new position, such as when the rider moves the throttle from maximum to a zero set point. In this case, the measured acceleration ($\alpha_M$) 706 may still be very high, and thus not accurately reflect application of the new target acceleration ($\alpha_T$) 801 of zero in determining the input to the torque drive system. Accordingly, for the first iteration following this change in throttle position, the recent dynamic acceleration delta ($\Delta\alpha_R$) 716 may be used in place of the current dynamic acceleration delta ($\Delta\alpha_D$) 720, as it is likely to reflect an amount of modification needed to account for a current inclination. A next iteration thus occurs after the measured acceleration ($\alpha_M$) 706 has had time to reflect use of the new target acceleration ($\alpha_T$) 801 in determining the input to the torque drive system. Block 808 determines this input as the current torque magnitude ($T_C$) 722 based on the target acceleration ($\alpha_T$) 801, the semi-static acceleration delta ($\Delta\alpha_S$) 714, and the current dynamic acceleration delta ($\Delta\alpha_D$) 720 as follows:

$$T_C = I(\alpha_T + \Delta\alpha_S + \Delta\alpha_D).$$

The detailed example described with reference to FIGS. 7 and 8 is but one example implementation of method 300 (see FIG. 3) and/or step 630 (see FIG. 6) that can be subject to various modifications. For example, as mentioned above, a rider skill level can be used to determine a rate at which the output torque of the motor of the MV is adjusted to match the current torque magnitude demanded by the rider or automated system. Thus, a torque drive system may receive the rider skill level as an input that influences how quickly the torque drive system adjusts the output torque of the motor. Accordingly, a rate of iteration may be adjusted based on the rider skill level to permit sufficient passage of time for the output torque of the motor to be driven to match a recent torque magnitude from a previous iteration. Alternatively, block 812 (see FIG. 8) may initiate and subsequently increment or decrement a count to permit a sufficient number of iterations to occur before setting the $1^{st}$ iteration flag to false. This count can be set to a value that allows a sufficient number of iterations to pass for the output torque of the motor to be driven to match a recent torque magnitude from a previous iteration. While this count is being adjusted, block 812 can set the current dynamic acceleration delta to zero or to a value that is determined based on a current sensor reading from the inclinometer. Such a value may be selected from a lookup table containing one or more of default values, values generated based on the rider and/or cargo weight, values obtained from a rider profile, and/or values trained and/or iteratively refined during vehicle operation by the rider. Moreover, the process described with reference to FIGS. 7 and 8 may be bypassed or modified if vehicle speed is not below a threshold. For example, if the vehicle speed is above a maximum vehicle speed threshold, then regenerative braking may be used to lower the vehicle speed into an acceptable range defined by the threshold. If the vehicle speed is at the threshold and if the throttle position is still commanding any amount of acceleration above zero, then the current torque magnitude ($T_C$) 722 may be reset to zero. Still further, the torque drive system may receive a signal indicative of vehicle speed and adjust a rate at which it drives the motor output torque based on the vehicle speed. In this way, the torque drive system can decrease the rate at which the motor output torque is increased as the vehicle speed increases, reduces the motor output torque as the vehicle sped approaches maximum, reduce the motor output torque to zero when the vehicle speed reaches maximum, and apply regenerative braking if the vehicle speed rises above maximum. These and other variations will be readily apparent to the skilled person based on the disclosure set forth herein.

Figure 9:
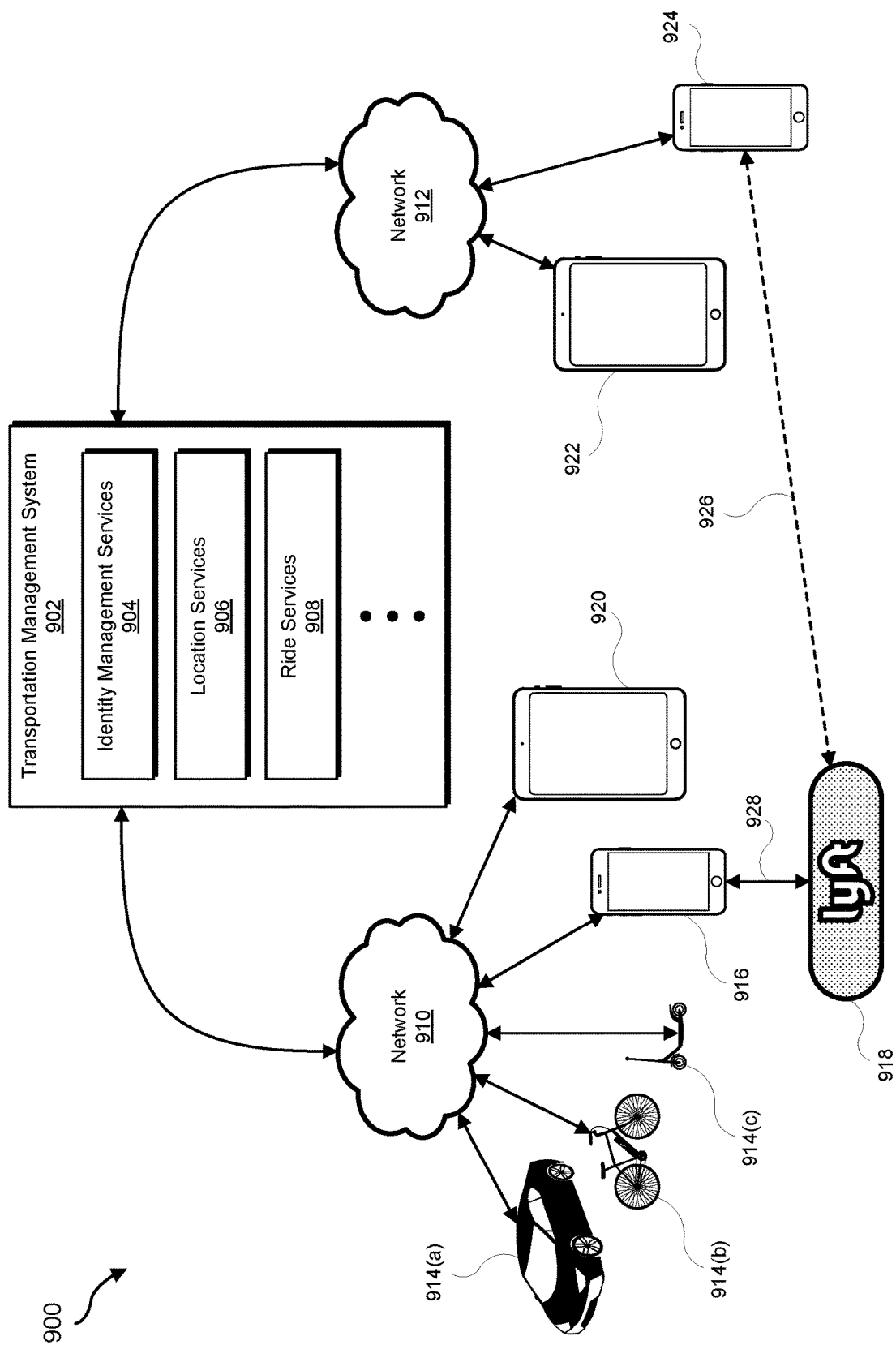
FIG. 9 shows a transportation management environment in accordance with various embodiments.

FIG. 9 shows a transportation management environment 900 in accordance with various embodiments. As shown in FIG. 9, a transportation management system 902 may run one or more services and/or software applications, including identity management services 904, location services 906, ride services 908, and/or other services. Although FIG. 9 shows a certain number of services provided by transportation management system 902, more or fewer services may be provided in various implementations. In addition, although FIG. 9 shows these services as being provided by transportation management system 902, all or a portion of any of the services may be processed in a distributed fashion. For example, computations associated with a service task may be performed by a combination of transportation management system 902 (including any number of servers, databases, etc.), one or more devices associated with a provider (e.g., devices integrated with managed vehicles 914(a), 914(b), and/or 914(c), provider computing devices 916 and tablets 920, and transportation management vehicle devices 918), and/or one or more devices associated with a ride requestor (e.g., the computing devices of the requestor 924 and tablets 922). In some embodiments, transportation management system 902 may include one or more general purpose computers, server computers, clustered computing systems, cloud-based computing systems, and/or any other computing systems or arrangements of computing systems. Transportation management system 902 may be configured to run any or all of the services and/or software components described herein. In some embodiments, the transportation management system 902 may include an appropriate operating system and/or various server applications, such as web servers capable of handling hypertext transport protocol (HTTP) requests, file transfer protocol (FTP) servers, database servers, etc.

In some embodiments, identity management services 904 may be configured to perform authorization services for requestors and providers and/or manage their interactions and/or data with transportation management system 902. This may include, e.g., authenticating the identity of providers and determining that they are authorized to provide services through transportation management system 902. Similarly, requestors' identities may be authenticated to determine whether they are authorized to receive the requested services through transportation management system 902. Identity management services 904 may also manage and/or control access to provider and/or requestor data maintained by transportation management system 902, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 902 may also manage and/or control access to provider and/or requestor data stored with and/or obtained from third-party systems. For example, a requester or provider may grant transportation management system 902 access to a third-party email, calendar, or task management system (e.g., via the credentials of the user). As another example, a requestor or provider may grant, through a mobile device (e.g., 916, 920, 922, or 924), a transportation application associated with transportation management system 902 access to data provided by other applications installed on the mobile device. In some examples, such data may be processed on the client and/or uploaded to transportation management system 902 for processing.

In some embodiments, transportation management system 902 may provide ride services 908, which may include ride matching and/or management services to connect a requestor to a provider. For example, after identity management services module 904 has authenticated the identity of a ride requestor, ride services module 908 may attempt to match the requestor with one or more ride providers. In some embodiments, ride services module 908 may identify an appropriate provider using location data obtained from location services module 906. Ride services module 908 may use the location data to identify providers who are geographically close to the requestor (e.g., within a certain threshold distance or travel time) and/or who are otherwise a good match with the requestor. Ride services module 908 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 908 may use rule-based algorithms and/or machine-learning models for matching requestors and providers.

Transportation management system 902 may communicatively connect to various devices through networks 910 and/or 912. Networks 910 and 912 may include any combination of interconnected networks configured to send and/or receive data communications using various communication protocols and transmission technologies. In some embodiments, networks 910 and/or 912 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 910 and/or 912 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 910 and/or 912 may include any combination of networks described herein or any other type of network capable of facilitating communication across networks 910 and/or 912.

In some embodiments, transportation management vehicle device 918 may include a provider communication device configured to communicate with users, such as drivers, passengers, pedestrians, and/or other users. In some embodiments, transportation management vehicle device 918 may communicate directly with transportation management system 902 or through another provider computing device, such as provider computing device 916. In some embodiments, a requestor computing device (e.g., device 924) may communicate via a connection 926 directly with transportation management vehicle device 918 via a communication channel and/or connection, such as a peer-to-peer connection, Bluetooth connection, NFC connection, ad hoc wireless network, and/or any other communication channel or connection. Although FIG. 9 shows particular devices communicating with transportation management system 902 over networks 910 and 912, in various embodiments, transportation management system 902 may expose an interface, such as an application programming interface (API) or service provider interface (SPI) to enable various third parties which may serve as an intermediary between end users and transportation management system 902.

In some embodiments, devices within a vehicle may be interconnected. For example, any combination of the following may be communicatively connected: vehicle 914(*a*), vehicle 914(*b*), vehicle 914(*c*), provider computing device 916, provider tablet 920, transportation management vehicle device 918, requestor computing device 924, requestor tablet 922, and any other device (e.g., smart watch, smart tags, etc.). For example, transportation management vehicle device 918 may be communicatively connected to provider computing device 916 and/or requestor computing device 924. Transportation management vehicle device 918 may establish communicative connections, such as connections 926 and 928, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 902 using applications executing on their respective computing devices (e.g., 916, 918, 920, and/or a computing device integrated within vehicle 914(*a*), vehicle 914(*b*), and/or vehicle 914(*c*)), which may include mobile devices (e.g., a mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 914(*a*), vehicle 914(*b*), and/or vehicle 914(*c*) may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 902. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 10:
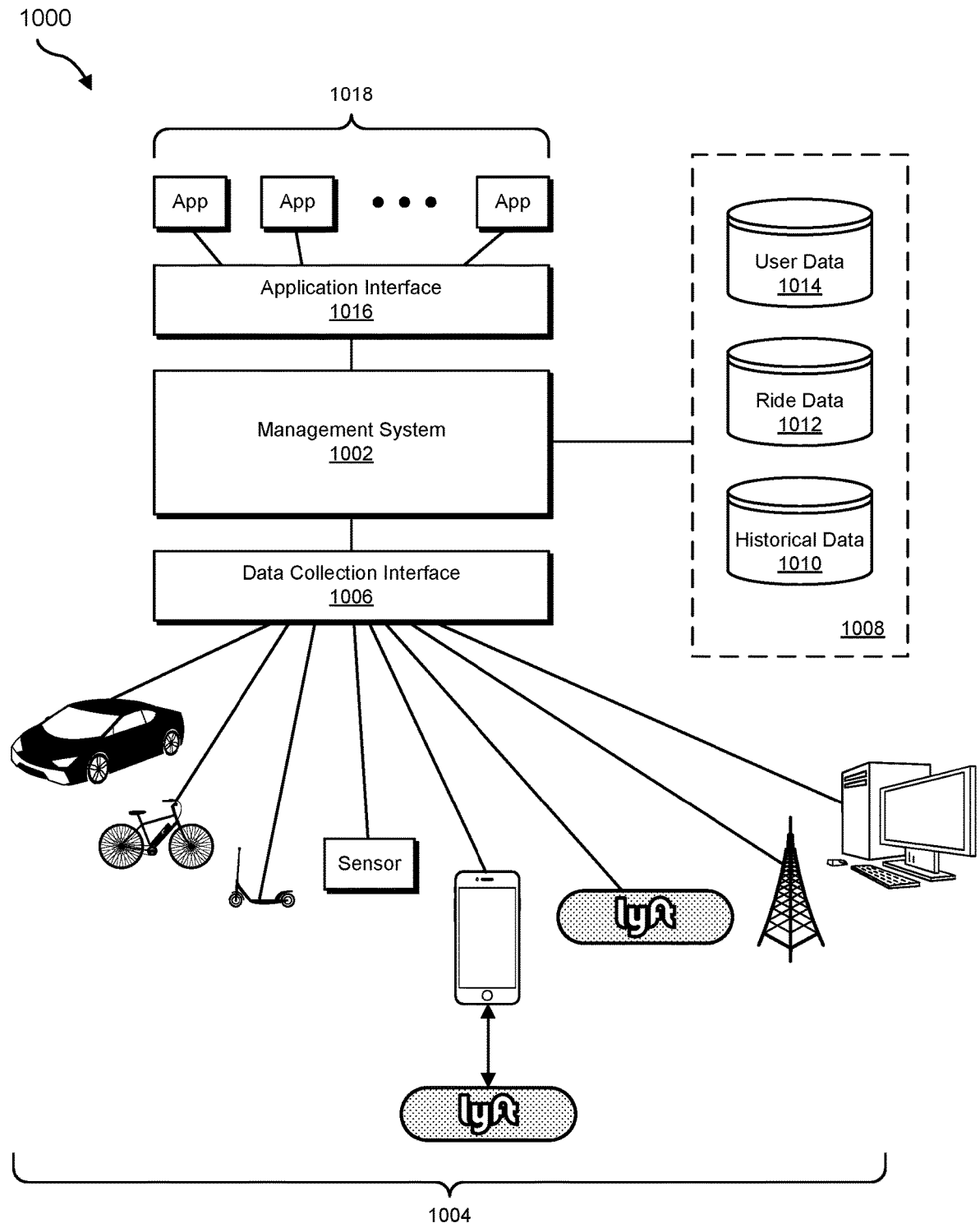
FIG. 10 shows a data collection and application management environment in accordance with various embodiments.

FIG. 10 shows a data collection and application management environment 1000 in accordance with various embodiments. As shown in FIG. 10, management system 1002 may be configured to collect data from various data collection devices 1004 through a data collection interface 1006. As discussed above, management system 1002 may include one or more computers and/or servers or any combination thereof. Data collection devices 1004 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1006 can include, e.g., an extensible device framework configured to support interfaces for each data collection device. In various embodiments, data collection interface 1006 may be extended to support new data collection devices as they are released and/or to update existing interfaces to support changes to existing data collection devices. In various embodiments, data collection devices may communicate with data collection interface 1006 over one or more networks. The networks may include any network or communication protocol as would be recognized by one of ordinary skill in the art, including those networks discussed above.

As shown in FIG. 10, data received from data collection devices 1004 can be stored in data store 1008. Data store 1008 may include one or more data stores, such as databases, object storage systems and services, cloud-based storage services, and other data stores. For example, various data stores may be implemented on a non-transitory storage medium accessible to management system 1002, such as historical data store 1010, ride data store 1012, and user data store 1014. Data stores 1008 can be local to management system 1002, or remote and accessible over a network, such as those networks discussed above or a storage-area network or other networked storage system. In various embodiments, historical data 1010 may include historical traffic data, weather data, request data, road condition data, or any other data for a given region or regions received from various data collection devices. Ride data 1012 may include route data, request data, timing data, and other ride related data, in aggregate and/or by requestor or provider. User data 1014 may include user account data, preferences, location history, and other user-specific data. Although certain data stores are shown by way of example, any data collected and/or stored according to the various embodiments described herein may be stored in data stores 1008.

As shown in FIG. 10, an application interface 1016 can be provided by management system 1002 to enable various apps 1018 to access data and/or services available through management system 1002. Apps 1018 may run on various user devices (including provider and requestor computing devices, such as those discussed above) and/or may include cloud-based or other distributed apps configured to run across various devices (e.g., computers, servers, or combinations thereof). Apps 1018 may include, e.g., aggregation and/or reporting apps which may utilize data 1008 to provide various services (e.g., third-party ride request and management apps). In various embodiments, application interface 1016 can include an API and/or SPI enabling third party development of apps 1018. In some embodiments, application interface 1016 may include a web interface, enabling web-based access to data 1008 and/or services provided by management system 1002. In various embodiments, apps 1018 may run on devices configured to communicate with application interface 1016 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

It should be appreciated that the present disclosure details systems and methods for controlling acceleration of a micro-mobility vehicle, such as an electric bike or scooter, that reduces variation in acceleration due to variable factors such as vehicle load and road surface inclination. The method may include receiving, by at least one computer processor of the personal mobility vehicle (i.e., micromobility vehicle), a sensed wheel speed of the personal mobility vehicle. Additionally, the method may include receiving, by the at least on computer processor, a sensed throttle deflection (i.e., throttle position) of the personal mobility vehicle, and determining, by the at least one computer processor, a measured acceleration of the personal mobility vehicle based at least in part on the sensed wheel speed. The method may also include deriving, by the at least one computer processor and based on the sensed throttle deflection, a target acceleration of the personal mobility vehicle. The method may further includes producing, by the at least one computer processor, an acceleration delta by comparing the measured acceleration to the target acceleration. Finally, the method may include adjusting, by the at least one computer processor and based on the acceleration delta, a torque demand (i.e., torque magnitude) of the personal mobility vehicle, wherein the at least one computer processor adjusts the torque demand in a manner determined to reduce a magnitude of the acceleration delta.

Accordingly, a throttle input may predictably map onto actual acceleration. Acceleration (e.g., determined from wheel speed) of the vehicle is measured in real time and compared to a target acceleration derived as a function of throttle deflection to produce an acceleration delta. A torque magnitude is adjusted based on the acceleration delta in a manner determined to reduce the acceleration delta. For example, a size and value of an adjustment to the torque demand may be determined based on a size and value of the acceleration delta. Additionally, a rider weight may be determined based on an acceleration delta measured when the vehicle is travelling on a level road surface, and the rider weight may be stored in a rider profile. The rider profile may thereafter be used to determine an initial adjustment when operating the same or a different vehicle. Rider skill level or preferences may also be used to determine the acceleration targets as a function of throttle deflection, and these characteristics may also be stored in the rider profile for subsequent usage. Advantageously, the method avoids sluggish acceleration for heavier riders and unsafe acceleration for lighter riders, while producing a more consistent acceleration despite changes in road surface inclination, with customization to rider skill levels and preferences.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive throttle and acceleration input data to be transformed, transform the data, output a result of the transformation to control operation of a MV, use the result of the transformation as feedback to an iterative process, and store the result of the transformation to update a rider profile. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   accessing a rider profile of a rider riding a micromobility vehicle;
   selecting a target acceleration profile based on the rider profile, the target acceleration profile comprising target accelerations of the micromobility vehicle for different throttle positions;
   detecting a current throttle position of the micromobility vehicle;
   determining an acceleration of the micromobility vehicle based at least on the current throttle position, wherein the acceleration is associated with a torque magnitude of the micromobility vehicle;
   comparing the acceleration of the micromobility vehicle with a target acceleration associated with the current throttle position, the target acceleration associated with the current throttle position being pre-specified in the target acceleration profile; and
   modifying the torque magnitude of the micromobility vehicle based at least on the rider profile and the comparison of the acceleration of the micromobility vehicle with the target acceleration associated with the current throttle position.

2. The method of claim 1, wherein the current throttle position is associated with a throttle deflection of the micromobility vehicle, and wherein the target acceleration is associated with the throttle deflection in lieu of the torque magnitude being associated with the throttle deflection.

3. The method of claim 1, further comprising:
   based at least on the comparison of the acceleration of the micromobility vehicle with the target acceleration, determining a delta between the acceleration and the target acceleration; and
   determining a rate for modifying the torque magnitude based at least on the delta, wherein the torque magnitude is modified based on the determined rate.

4. The method of claim 1, further comprising:
   determining a change in the acceleration of the micromobility vehicle based at least on cargo added to the micromobility vehicle; and
   comparing the changed acceleration with the target acceleration, and wherein the torque magnitude is modified based further on the comparison of the changed acceleration with the target acceleration.

5. The method of claim 1, wherein the acceleration is an angular acceleration of a wheel of the micromobility vehicle measured in real-time, and the target acceleration is a target angular acceleration of the wheel, wherein the torque magnitude is modified based further on the comparison of the angular acceleration with the target angular acceleration.

6. The method of claim 1, wherein the target acceleration associated with the current throttle position is determined for the rider profile, and wherein the torque magnitude is modified based on the target acceleration determined for the rider profile.

7. The method of claim 1, further comprising determining a rate for modifying the torque magnitude based on the rider profile, wherein the torque magnitude is modified based on the rate determined for the rider profile.

8. The method of claim 1, further comprising:
displaying a rate of acceleration associated with the current throttle position.

9. A system comprising:
a non-transitory memory;
one or more processors configured to execute instructions from the non-transitory memory to perform operations comprising:
accessing a rider profile of a rider riding a micromobility vehicle;
selecting a target acceleration profile based on the rider profile, the target acceleration profile comprising target accelerations of the micromobility vehicle for different throttle positions;
detecting a current throttle position of the micromobility vehicle;
determining an acceleration of the micromobility vehicle based at least on the current throttle position, wherein the acceleration is associated with a torque magnitude of the micromobility vehicle;
comparing the acceleration of the micromobility vehicle with a target acceleration associated with the current throttle position, the target acceleration associated with the current throttle position being pre-specified in the target acceleration profile; and
modifying the torque magnitude of the micromobility vehicle based at least on the rider profile and the comparison of the acceleration of the micromobility vehicle with the target acceleration associated with the current throttle position.

10. The system of claim 9, wherein the current throttle position is associated with a throttle deflection of the micromobility vehicle, and wherein the target acceleration is associated with the throttle deflection in lieu of the torque magnitude being associated with the throttle deflection.

11. The system of claim 9, wherein the operations further comprise:
based at least on the comparison of the acceleration of the micromobility vehicle with the target acceleration, determining a delta between the acceleration and the target acceleration; and
determining a rate for modifying the torque magnitude based at least on the delta, wherein the torque magnitude is modified based on the determined rate.

12. The system of claim 9, wherein the operations further comprise:
determining a change in the acceleration of the micromobility vehicle based at least on cargo added to the micromobility vehicle; and
comparing the changed acceleration with the target acceleration, and wherein the torque magnitude is modified based further on the comparison of the changed acceleration with the target acceleration.

13. The system of claim 9, wherein the acceleration is an angular acceleration of a wheel of the micromobility vehicle measured in real-time, and the target acceleration is a target angular acceleration of the wheel, wherein the torque magnitude is modified based further on the comparison of the angular acceleration with the target angular acceleration.

14. The system of claim 9, wherein the target acceleration associated with the current throttle position is determined for the rider profile, and wherein the torque magnitude is modified based on the target acceleration determined for the rider profile.

15. The system of claim 9, wherein the operations further comprise determining a rate for modifying the torque magnitude based on the rider profile, wherein the torque magnitude is modified based on the rate determined for the rider profile.

16. The system of claim 9, wherein the operations further comprise:
displaying a rate of acceleration associated with the current throttle position.

17. A computer-readable medium comprising:
computer-readable instructions that, when executed by at least one processor of a computing device, cause the computing device to:
access a rider profile of a rider riding a micromobility vehicle;
select a target acceleration profile based on the rider profile, the target acceleration profile comprising target accelerations of the micromobility vehicle for different throttle positions;
detect a current throttle position of the micromobility vehicle;
determine an acceleration of the micromobility vehicle based at least on the current throttle position, wherein the acceleration is associated with a torque magnitude of the micromobility vehicle;
compare the acceleration of the micromobility vehicle with a target acceleration associated with the current throttle position, the target acceleration associated with the current throttle position being pre-specified in the target acceleration profile; and
modify the torque magnitude of the micromobility vehicle based at least on the rider profile and the comparison of the acceleration of the micromobility vehicle with the target acceleration associated with the current throttle position.

18. The computer-readable medium of claim 17, wherein the current throttle position is associated with a throttle deflection of the micromobility vehicle, and wherein the target acceleration is associated with the throttle deflection in lieu of the torque magnitude being associated with the throttle deflection.

19. The computer-readable medium of claim 17, wherein the instructions further cause the computing device to:
based at least on the comparison of the acceleration of the micromobility vehicle with the target acceleration, determine a delta between the acceleration and the target acceleration; and
determine a rate for modifying the torque magnitude based at least on the delta, wherein the torque magnitude is modified based on the determined rate.

20. The computer-readable medium of claim 17, wherein the instructions further cause the computing device to:

determine a change in the acceleration of the micromobility vehicle based at least on cargo added to the micromobility vehicle; and compare the changed acceleration with the target acceleration, and wherein the torque magnitude is modified based further on the comparison of the changed acceleration with the target acceleration.

21. The computer-readable medium of claim 17, wherein the acceleration is an angular acceleration of a wheel of the micromobility vehicle measured in real-time, and the target acceleration is a target angular acceleration of the wheel, wherein the torque magnitude is modified based further on the comparison of the angular acceleration with the target angular acceleration.

22. The computer-readable medium of claim 17, wherein the target acceleration associated with the current throttle position is determined for the rider profile, and wherein the torque magnitude is modified based on the target acceleration determined for the rider profile.

23. The computer-readable medium of claim 17, wherein the instructions further cause the computing device to determine a rate for modifying the torque magnitude based on the rider profile, wherein the torque magnitude is modified based on the rate determined for the rider profile.

24. The computer-readable medium of claim 17, wherein the instructions further cause the computing device to display a rate of acceleration associated with the current throttle position.

* * * * *